UNITED STATES PATENT OFFICE.

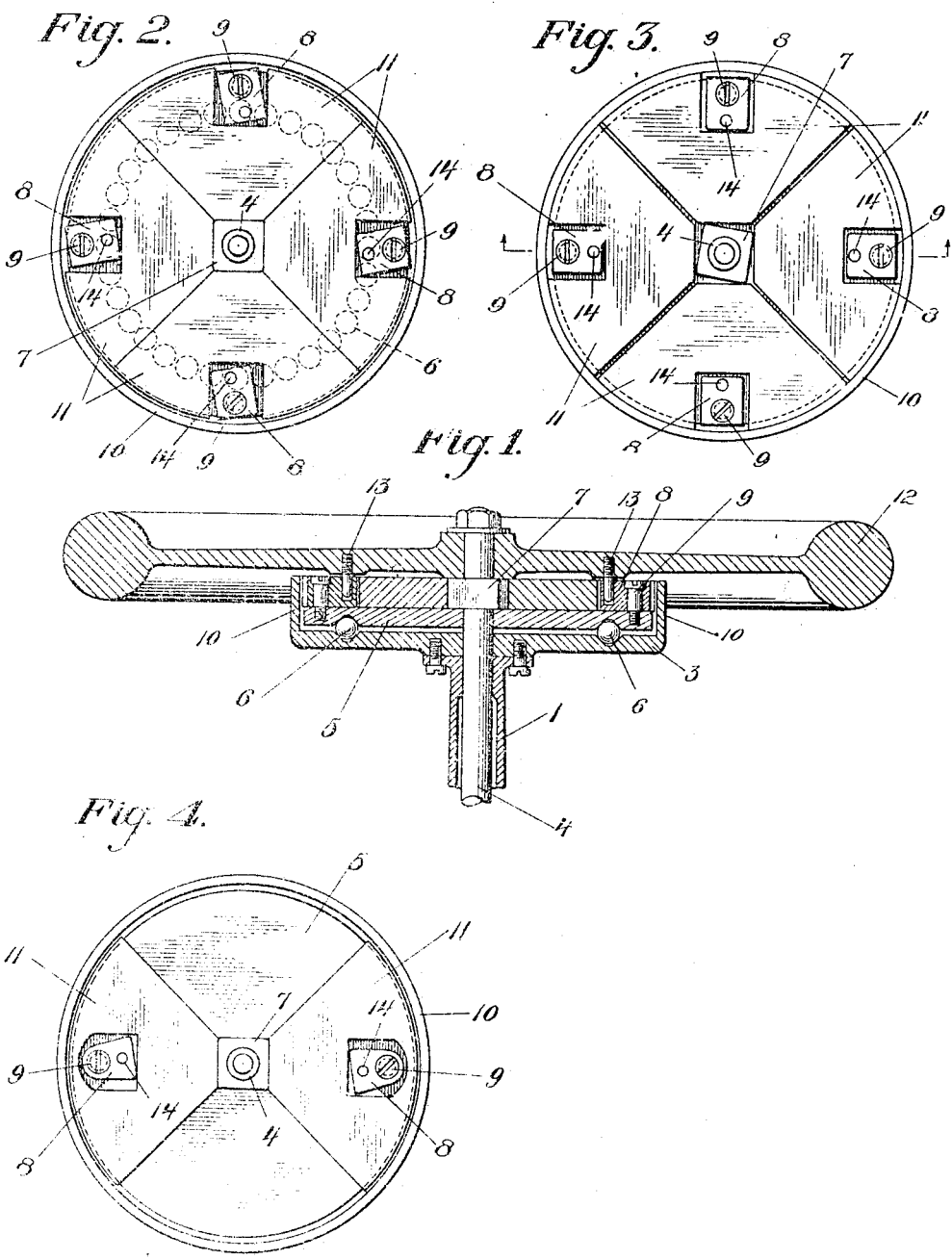

JOSEPH M. STOUGHTON, OF YONKERS, NEW YORK.

MEANS FOR TRANSMITTING MOTION.

1,121,148.

Specification of Letters Patent.

Patented Dec. 15, 1914.

Application filed June 4, 1913. Serial No. 771,594.

*To all whom it may concern:*

Be it known that I, JOSEPH M. STOUGHTON, a citizen of the United States of America, residing in Yonkers, county of Westchester, State of New York, have invented certain Improved Means for Transmitting Motion, of which the following is a specification.

This invention relates in part to devices for transmitting motion, as to a shaft for its rotation, and for preventing reactive movement of the driving member by strains transmitted thereto through the shaft. Stated in another way, rotary motion is freely transmitted from one member to another but the parts are locked against transmission of motion from the latter member to the former. Such a device is applicable in various relations as, for instance, to the steering shaft of an automobile and otherwise for transmission of power.

In the accompanying drawing the invention is shown in elementary form.

Figure 1 is a transverse section: Fig. 2, a plan showing the parts in position in which the part to be driven, for instance a shaft, may be rotated by the driving member. Fig. 3, a like view showing the parts in position in which said driven member is locked against imparting rotative movement to the driving member: Fig. 4, a like view showing a modification.

The locking means is by preference a true friction lock, in which plain friction surfaces are used. They might, however, be surfaces roughened, serrated or toothed. The invention resides primarily in the locking devices which may assume a variety of forms provided they embody the principles and general mode of operation of this invention.

Referring now to the drawing, 1 represents a fixed sleeve to which is rigidly attached a circular cup or brake drum 3 within which are the locking devices with which it coöperates.

4 is a shaft to be driven located within the fixed sleeve 1 and extending upwardly concentrically through the casing 3. Within the casing is disposed a disk 5 having a loose center bearing on the shaft 4 and between which and the bottom of the casing 3 is an annular ball race 6.

Above the disk 5 there is fast on or formed with the shaft a hub or head 7 having camming surfaces and shown in this instance as square, and adjacent the periphery of the disk 5 there are pivotally mounted a plurality of blocks 8 that turn on their respective pivot bolts 9 fixed in the rotatable disk 5. In the particular form shown the inner faces of these blocks, when in central position, are each at right angles to a radius passing through the pivot bolt. In other words, their corners will be in a line at right angles to such radius. Interposed between the interior surface of the wall or flange 10 of the annular casing or brake drum 3 and the hub 7 fixed on shaft 4 are sectors of a disk. Four sectors 11 are shown in Figs. 2 and 3. Their apexes are cut off and their inner surfaces may closely fit, as in Fig. 2, against the corresponding sides of the head 7, in which case, their peripheries are out of frictional contact with the inner surface of the rim 10. Midway in the arc of each sector or adjacent its periphery it is recessed to receive the block 8, the inner end of the recess being also in a straight line at right angles to a radius from the axis of the shaft. If a rotative strain be imparted to the shaft 4, its head 7 will move the sectors outwardly into frictional contact with the rim 10 and form an effective lock preventing such rotation. If, however, the blocks 8 are swung to one side of normal central position, a corner of each block will act upon its sector to move it out of contact with the rim 10 and into intimate driving contact with the corresponding face of the head 7. If rotative strain upon the blocks 8 be continued, the shaft will be positively rotated and obviously such rotation may be produced in either direction. In the present instance, such rotative means is shown as a steering wheel 12 loosely mounted on the upper end of shaft 4 and having pins 13 that enter apertures 14 in blocks 8 between the pivotal axes of the blocks and the axis of shaft 4.

Instead of four sectors, one, two or three only need be employed or even more than four. Two are shown in Fig. 4. One sector only would be open to the objection that lateral strains would not be counter-acted or counter-balanced. If the head be triangular, one, two or three sectors may be used. The best practice would, it is thought, indicate four sectors and a square head. The head may however be of any suitable cross section and the radially movable members or sectors be correspondingly adapted thereto. The head should, however, in all cases have camming surfaces.

The operative surfaces upon the shaft and coöperating surfaces on the sectors may be of any formation or contour adapted to produce the desired result. The radially movable members are preferably sectors of a disk although it is only necessary that they should have curved faces to coöperate with the annular member 10 (which in the special adaptation shown is fixed) and inner surfaces adapted to coöperate with suitable surface on the shaft, or head.

I claim—

1. In combination, a stationary brake drum, a concentric shaft equipped with a head having camming faces, and a plurality of sectors located within the drum and adapted to slide radially with respect to the shaft, each sector having a truncate face abutting the said head and a circular face adapted to engage the drum wall, the said head upon rotation of the shaft, being adapted to cam the sectors against the drum wall and thereby lock the shaft from further rotation.

2. In combination, a stationary brake drum, a concentric shaft equipped with a head having camming surfaces, a plurality of sectors located within the drum and adapted to slide radially with respect to the shaft, each sector having a truncate face abutting the said head and a circular face adapted to engage the drum wall, the said head upon rotation of the shaft, being adapted to cam the sectors against the drum wall thereby locking the shaft from further rotation, and means adapted to disengage the sectors from the drum wall and move them into engagement with the shaft head.

3. In combination, a stationary brake drum, a concentric shaft equipped with a head having camming surfaces, a plurality of sectors located within the drum and adapted to slide radially with respect to the shaft, each sector having a truncate face abutting the said head and a circular face adapted to engage the drum wall, the said head upon rotation of the shaft, being adapted to cam the sectors against the drum wall thereby locking the shaft from further rotation, and means adapted to disengage the sectors from the drum wall and move them into engagement with the shaft head, the said means including mechanism adapted to rotate the shaft.

4. In combination, a stationary brake drum, a concentric shaft equipped with a head having camming surfaces, a plurality of sectors located within the drum and adapted to slide radially with respect to the shaft, each sector having a truncate face abutting the said head and a circular face adapted to engage the drum wall, the said head being adapted, upon rotation of the shaft, to cam the sectors against the drum wall thereby locking the shaft from further rotation, and means adapted to disengage the sectors from the drum wall, move them into engagement with the shaft head, and rotate them within the drum.

5. In combination, a stationary brake drum, a concentric shaft equipped with a head having camming surfaces, a plurality of sectors located within the drum and adapted to slide radially with respect to the shaft, each sector having a truncate face abutting the said head and a circular face adapted to engage the drum wall, the said head being adapted, upon rotation of the shaft, to cam the sectors against the drum wall thereby locking the shaft from further rotation, mechanism adapted to disengage the sectors from the drum wall, move them into engagement with the shaft head, and rotate them within the brake drum, and a hand wheel for operating the said mechanism.

6. In combination, a stationary brake drum, a concentric shaft equipped with a head having camming surfaces, a plurality of sectors located within the drum and adapted to slide radially with respect to the shaft, each sector having a truncate face abutting the said head and a circular face adapted to engage the drum wall, the said head being adapted, upon rotation of the shaft, to cam the sectors against the drum wall thereby locking the shaft from further rotation, mechanism including camming devices adapted to disengage the sectors from the drum wall, move them into engagement with the shaft head and rotate them within the brake drum, and a hand wheel, concentric with said shaft and brake drum and adapted to operate the said mechanism.

7. The combination of a fixed annular locking member, a rotatable shaft concentric thereto and having a head with camming surfaces, a freely revoluble support mounted to turn about the shaft within the annular member, radially movable sectors of a disk loosely resting upon said revoluble support and substantially filling the annular space between the shaft and the annular member, the inner ends of the radially movable sectors being adapted to coact with the shaft head whereby, when an increment of rotation is imparted to the shaft, the radially movable sectors are driven outwardly into locking engagement with the annular member and whereby, when the radially movable sectors are forced inwardly, they form locking engagement with the shaft to rotate therewith, and means for moving the radially movable sectors of the disk into such locking engagement with the shaft.

8. The combination of a fixed annular member, a rotatable shaft concentric thereto and having a head with camming surfaces, a plurality of sectors interposed between the shaft and the inner surface of the annular member the inner ends of the sectors being adapted to coact with the shaft head whereby, when an increment of rotation is imparted to the shaft, the radially movable sectors are driven outwardly into locking engagement with the annular member and whereby, when the radially movable sectors are forced inwardly, they form locking engagement with the shaft to rotate therewith, pivoted rocking blocks located in apertures in the sectors and means for rocking the blocks to thereby force the sectors into locking engagement with the shaft.

9. The combination of a fixed annular locking member, a rotatable shaft concentric thereto and having a head with camming surfaces, a freely revoluble support mounted to turn about the shaft within the annular member, radially movable sectors loosely resting upon such revoluble support, blocks pivoted upon such support in apertures in the sectors, the inner ends of the sectors being adapted to coact with the shaft head whereby, when an increment of rotation is imparted to the shaft, the sectors are driven outwardly into locking engagement with the annular member and whereby, when the radially movable sectors are forced inwardly, they form locking engagement with the shaft to rotate therewith and means connected with the pivoted blocks to rock them upon their pivots and force the sectors into locking engagement with the shaft.

In testimony whereof, I have hereunto subscribed my name.

JOSEPH M. STOUGHTON.

Witnesses:
L. F. BROWNING,
HELEN DE MOYA.